Aug. 17, 1926. 1,596,387
L. L. YATES ET AL
BRAKE BEAM GUARD
Filed Nov. 5, 1925

INVENTORS
Luther L. Yates
Damian L. Reynolds
Loyd E. Cartmill
BY John Flam
THEIR ATTORNEY Patented Aug. 17, 1926.

1,596,387

UNITED STATES PATENT OFFICE.

LUTHER L. YATES, LOYD EDWARD CARTMILL, AND DAMIAN L. REYNOLDS, OF SAN FRANCISCO, CALIFORNIA.

BRAKE-BEAM GUARD.

Application filed November 5, 1925. Serial No. 67,133.

This invention relates to railway cars, and more especially to a safety device for use in connection with the braking equipment therefor.

In railway cars of all types, brake shoes are used, arranged to contact with the periphery of the car wheels. These brake shoes are mounted on brake beams extending transversely of the car, and supported by links or chains so as to permit a swinging movement by the aid of brake operating levers, either manually or by fluid pressure. Since there are four wheels near each end of the car, there are two such brake beams, near each truck and arranged substantially symmetrically therewith.

Due to the necessarily hard usage to which railroad equipment is subjected, it is quite often that the brake beam drops from its hanging support, or else some part of the brake beam or its associated mechanism breaks so as to permit the beam to fall. This may cause serious damage when the car is in operation, such as derailment or even a wreck.

In order to obviate such possibilities, it has been proposed heretofore to provide guides or guards underneath the car, upon which the brake beam may rest in case it should fall, or when the brakes are released, and upon which it will be supported. Such prior devices are either in the form of rigid, fixed bars, or of resilient bars. But both forms have serious disadvantages, which our invention is aimed to correct. Thus when rigid bars are used as guards, the severe hammering and vibration soon cause the bar to break also. Furthermore, such rigid bars, not being capable of conforming by themselves to variations in the alinement or adjustment of the beams, may not serve properly as guides when the brakes are released, for the beam may be entirely out of contact therewith. Our invention overcomes these difficulties by providing a self-conforming seat for the beam.

As regards the spring bar type, these must be very carefully tempered so as to impart the desired resiliency; and when this is done, there is apt to be crystallization due to the incessant use, with ultimate rupture. If not tempered sufficiently, a permanent deformation of the bar results, rendering it useless. These disadvantages are all likewise overcome by the aid of our invention.

Another serious disadvantage of these prior types results from the fact that the stationary support beneath the car must be drilled with several holes to support the guide or guard, and this element is seriously weakened. Our device, on the other hand, can be installed without appreciable weakening of this support.

Both these old types also have the disadvantage that the force exerted by one brake beam affects the entire guide for both beams, by the transmission of shocks, etc. thereto. Our invention overcomes this feature.

For convenience, the spring plank is usually used as the stationary support for the brake beam guide. This plank is merely a transverse channel or the like upon which the heavy compression springs of the truck rest. It is an object of our invention to make it possible to suspend the beam guide on the plank in a simple manner that is in no wise harmful to the function thereof.

It is still another object of our invention to make it possible to install the guide with a minimum of bother and expense.

It is still another object of our invention to provide a double brake beam guide that functions properly for either beam, and without interference from the operation of the other beam.

It is still another object of our invention to provide a yielding bar for a guide, the yielding effect being secured at least partly by friction action on the beam supporting rod.

Our invention possesses many other advantages, and has other objects which may be made more easily apparent from a consideration of one embodiment of our invention. For this purpose we have shown a form in the drawings accompanying and forming part of the present specification. We shall now proceed to describe this form in detail, which illustrates the general principles of our invention; but it is to be understood that this detailed description is not to be taken in a limiting sense, since the scope of our invention is best defined by the appended claims.

Referring to the drawings.

Figure 2:
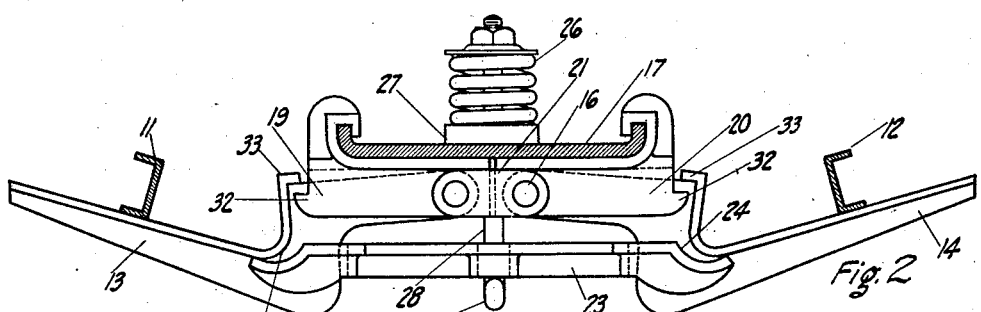
Fig. 2 is a view similar to Fig. 1, but illustrating the position of the guides when the brake beams are in free position, or when they have dropped onto the guides.

In the present instance, we show the brake beams 11 and 12 as formed of conventional channel iron, although other types can be used. The guard supports or guides are formed of rigid bars or levers 13 and 14, but which are so supported as to be moved when the brake beams drop thereon, as shown in Fig. 2. For providing a sufficiently large guiding surface, the active portion of each of the levers 13 and 14 is formed with a broad face 15, and a reenforcing central web depends below this face.

To permit the levers or guides 13 and 14 to move yieldingly in accordance with the movement of the beams 11 and 12, they are each pivoted at one end on rivets or pins 16, which are located in a stationary portion of the apparatus, as will now be described in detail.

Figure 4:
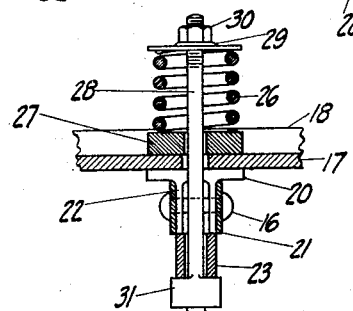
Fig. 4 is a sectional view taken along plane 4—4 of Fig. 1.

In order to provide a stationary support for the guide mechanism, we conveniently make use of the spring plank 17 that extends transversely beneath the car, and which derives its name from the fact that at its ends it provides a seat for the heavy truck bolster springs. It is usually formed of a channel shaped piece of metal, having the vertical flanges 18. There are two supporting castings 19 and 20 in this instance, each of which hooks over one of the flanges, and which are connected together beneath the spring plank 17 by the aid of the straps 21, through which the rivets 16 pass, forming the pivot points for the levers 13 and 14. The castings 19 and 20 each have a pair of depending, spaced flanges or ribs 22 (Fig. 4) forming a groove transverse to the plank 17 in which the depending flange or rib of each of the guides 13 and 14 is accommodated.

It is evident that the assembly of the support for the levers 13 and 14 upon the plank 17 is a comparatively simple matter, especially since the supporting casting is made in two parts.

Figure 1:
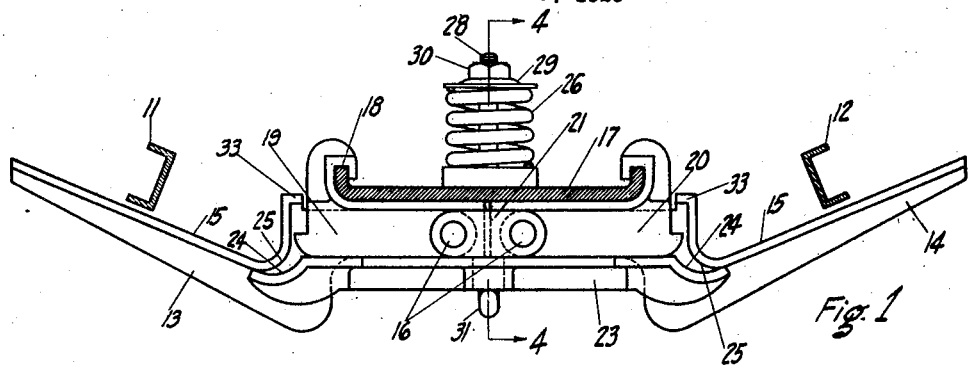
Figure 1 is a side view of one embodiment of our invention, shown as applied to a double brake beam rigging, with the brake beams in applied position.

We shall now describe how the levers 13 and 14 are yieldingly held in the inclined position of Fig. 1, and how they may be urged, by the weight of the brake beams, into a lower position, such as in Fig. 2.

Figure 3:
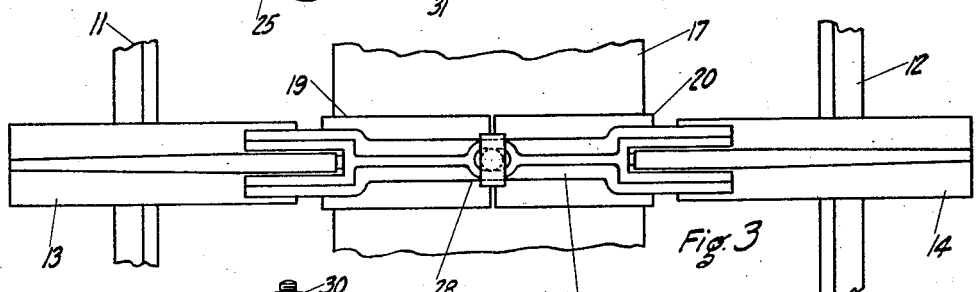
Fig. 3 is a bottom plan view of the device.

A friction device or strap 23 is resiliently urged, in a manner to be hereinafter described, against certain surfaces of the levers 13 and 14. For this purpose it is bifurcated at each end, as shown most clearly in Fig. 3, the forked ends encompassing or embracing the central ribs of the levers, and having concave upper surfaces 24. These surfaces are arranged to coact with the lower convex surfaces 25 formed on the bottom of the upper flange of levers 13 and 14. Assuming that the device 23 is resiliently urged into the position shown, it is evident that upon depression of either lever 13 or 14, there will be a relative movement between the surfaces 24 and 25, to which movement a frictional force is opposed, the extent of which is dependent upon the strength of the force which urges the two surfaces together. In Fig. 2, an intermediate depressed position is illustrated, the device 23 having been depressed below the supports 19 and 20, which ordinarily serve to limit the movement of the device 23.

Due to the use of a yielding force holding levers 13 and 14 in place, these levers can readily accommodate themselves to varying requirements occasioned by variations in the brake mechanisms.

It is possible to provide for a resilient force urging device 23 against levers 13 and 14, as for example, by making this device from spring material. However, we prefer to utilize a compression spring 26 as the source of the yielding force. Due to this structure, repeated flexing of the levers 13 and 14 has no deleterious effect upon the spring, so that it will remain in operating condition indefinitely. In the present instance, the spring 26 is placed above the plank 17, and rests on a spring rest 27 placed directly on the plank. A bolt 28 having a T head 31 passes through the spring and also through an aperture in the plank 17, and is provided with a washer 29 bearing against the top of the spring. A nut 30 permits relative axial adjustment between the bolt and the spring. It is evident that a tensile force exerted downwardly upon the bolt 28 will place the spring into compression.

This tensile force is arranged to be exerted by the forces acting on the levers 13 and 14. For this purpose, the head of bolt 28 engages the bottom surface of the friction device 23. By proper adjustment of nut 30, it is plain that the initial compression of spring 26 can be controlled, and consequently, the initial force with which device 23 is urged against the levers 13 and 14, and against the bottom of support 19—20. In this way, by adjustment of nut 30, it is possible to increase or decrease the amount of resistance to motion of parts 13 and 14. As the weight of the brake beams is imposed upon these levers, the spring 26 is further compressed, due to the downward movement of the bolt 28. The mechanism reaches a stable position as soon as the force of compression of spring 26, and of friction between surfaces 24 and 25, counterbalances the forces exerted on levers 13 and 14.

It is evident that there is no interference between the two levers 13 and 14, each being capable of independent operation. In case one lever is to sustain a larger force than the other, it would simply be lowered farther than the other, the friction device 23 being then in a slanting position. The head 31 of the bolt 28 is purposely rounded as shown in Figs. 1 and 2 in order to facilitate this mode of operation. It is furthermore to be noted that it is possible to determine the initial position of either lever independently of the other by inserting stops or shims of proper length between the elements 19 or 20 and 23.

The mechanism described functions both as a brake beam guide, as well as a guard to prevent the beam from falling. As a guide it adjusts itself automatically to the movement of the beams from brake applying position to brake releasing position. In order to limit downward movement of the levers or guides 13 and 14 when unusual conditions exist, we provide a pair of stop lugs 32, one on each side of the support 19—20, with which lugs 33 on the levers 13 and 14 are arranged to cooperate.

We claim:

1. In a brake beam guide and guard, a pivotally mounted beam supporting member, and means for frictionally opposing movement of said member about its pivot.

2. In a brake beam guide and guard, a beam supporting member arranged to be engaged and moved by the brake beam, and means for frictionally and resiliently opposing said motion.

3. In a brake beam guide and guard, a pivotally mounted beam supporting member arranged to be engaged and moved by the brake beam, and means for frictionally and resiliently resisting the motion of said member.

4. In a brake beam guide and guard, a beam supporting member arranged to be moved by the brake beam, a friction device engaging the member for opposing its motion, and a resilient element urging the device yieldingly against the member.

5. In a brake beam guide and guard, a pair of beam supporting members extending in opposite directions and arranged to be engaged and moved by the brake beams, a friction device engaging both members for opposing their motion, and a compression spring urging the device yieldingly against the member.

6. In a brake beam guide and guard, a stationary support, a pair of beam supporting members supported pivotally thereon, and extending in opposite directions, a friction device engaging both members and opposing the pivotal movement of the members and a compression spring urging the device against the members.

7. In a brake beam guide and guard arranged to be located beneath a railway car having a stationary element upon which the guard can be supported, a two-part stationary support to encompass said element and to provide a pair of pivot points beneath said element, said support being arranged for installation by uniting the two parts thereof beneath the car, a pair of levers, each pivoted on the said pivot points and extending in opposite directions beneath the element, a strap engaging both said levers on a bottom surface thereof, a bolt extending from the strap and through the element, and a compression spring around the bolt urging the strap upwardly against the levers.

8. In a brake beam guide and guard, a pivoted lever having a curved surface, and a friction device engaging the curved surface and having a cooperating surface for frictionally opposing movement of the lever.

9. In a brake beam guide and guard arranged to be supported beneath a railway car, a lever pivoted beneath the car and having a lower convex surface, a friction device having a cooperating concave surface, and resilient means urging the friction device against the lever.

10. In a brake beam guide and guard, a pivoted bar, a support therefor, means for resiliently opposing movement of said bar, and a stop on said support for limiting the movement of the bar.

In testimony whereof we have hereunto set our hands.

LUTHER L. YATES.
LOYD EDWARD CARTMILL.
DAMIAN L. REYNOLDS.